United States Patent [19]

Krenkel et al.

[11] Patent Number: 5,657,842

[45] Date of Patent: Aug. 19, 1997

[54] BRUSH CONTACT FOR A VEHICLE

[75] Inventors: Walter Krenkel, Ludwigsburg; Bernhard Heidenreich, Stuttgart, both of Germany

[73] Assignee: Deutsche Forschungsanstalt fur Luft und Raumfahrt B.V., Cologne, Germany

[21] Appl. No.: 677,767

[22] Filed: Jul. 10, 1996

[30] Foreign Application Priority Data

Jul. 10, 1995 [DE] Germany ............... 195 24 708.6

[51] Int. Cl.⁶ ................ B60L 5/08; B60L 5/20; C22C 1/09
[52] U.S. Cl. ............ 191/45 R; 191/59.1; 310/251
[58] Field of Search ................. 191/45 R, 49, 191/50, 54, 55, 59, 59.1; 310/220, 251, 252, 253; 427/114

[56] References Cited

U.S. PATENT DOCUMENTS

| | | | |
|---|---|---|---|
| 3,996,408 | 12/1976 | Fridman et al. | 310/253 X |
| 4,084,669 | 4/1978 | Suwa et al. | 191/45 R |
| 4,101,453 | 7/1978 | Orford et al. | 310/252 X |
| 4,146,119 | 3/1979 | Ingersoll | 191/59.1 X |
| 4,339,021 | 7/1982 | Kosuda et al. | 191/50 |
| 5,263,562 | 11/1993 | Hoffmann et al. | 191/45 R |
| 5,380,475 | 1/1995 | Goedtke et al. | 264/29.5 |
| 5,531,301 | 7/1996 | Makino et al. | 191/55 |

FOREIGN PATENT DOCUMENTS

| | | | |
|---|---|---|---|
| 0212666 | 3/1987 | European Pat. Off. | 191/59.1 |
| 2830027 | 1/1979 | Germany . | |
| 3240709 | 5/1984 | Germany | 191/45 R |
| 3933039 | 4/1991 | Germany . | |
| 52-89505 | 7/1977 | Japan . | |
| 53-104508 | 9/1978 | Japan . | |
| 146310 | 11/1979 | Japan | 191/59.1 |
| 113210 | 9/1980 | Japan | 191/59.1 |
| 99901 | 6/1984 | Japan | 191/59.1 |
| 63-140050 | 11/1988 | Japan . | |

OTHER PUBLICATIONS

Mazdiyasni, Fiber Reinforced Ceramic Composites, Noyes Publications, 1990, pp. 431, 433, 445–450.

Park et al., The Effect of Sic Codeposition on the Structure and Mechanical Properties of Carbon/Carbon Composites Prepared by Chemical Vapor Deposition, Carbon, vol. 30, No. 6, pp. 939, 941 (1992).

Primary Examiner—Karen B. Merritt
Assistant Examiner—Scott L. Lowe
Attorney, Agent, or Firm—Felfe & Lynch

[57] ABSTRACT

Brush contact for a vehicle, in particular a vehicle that runs on rails and that has a propulsion unit that is to be supplied with an electric current, with a sliding element for the transferral of the electric current from a live conductor, which is carrying an electric current, into the vehicle, whereby the sliding element contains carbon in at least one part of its contact surface that is turned toward the live conductor, whereby the brush contact is characterized by the feature that the contact surface that is turned toward the live conductor has at least one current-transferral region of a layer that comprises a composite material based on carbon-fiber-reinforced carbon.

18 Claims, 3 Drawing Sheets

BRUSH CONTACT FOR A VEHICLE

BACKGROUND OF THE INVENTION

The present invention concerns a brush contact for a vehicle, in particular for a vehicle that runs on rails and that has a propulsion unit that is to be supplied with electric current, with a sliding element for the transferral of the electric current from a live conductor that is carrying an electric current into the vehicle, whereby the sliding element contains carbon in at least one part of its contact surface that is turned toward the live conductor.

Vehicles that are used for the conveyance of passengers, such as trains, underground trains, street cars and trolley buses-tap off the current for their electrical propulsion units from a live conductor by means of a sliding element. The live conductors can be overhead wires that run above the track or, on the other hand, they can be current rails that are arranged inside the track or on the side of the track, for example, a third rail. The sliding element must engage the live conductor as continuously as possible in order to ensure the reliable transfer of current while traveling, for which purpose a uniform force is required to hold the contact surface of the sliding element in engagement with the live conductor. Such problems occur when the movement of the sliding element along the live conductor takes place at high speed such as is the case with, for example, high speed trains that travel at speeds far in excess of 250 km/h. At these speeds, one can observe a certain lifting up of the sliding element from the live conductor, whereby this leads to spark formation and is accompanied by increased wear of the sliding element because of spark erosion. In order to avoid such lifting up, a high force that presses the components together must be applied and this is associated with a high expenditure of power, especially in relation to a high mass of the brush contact. Conventional brush contacts for such high speed trains are assembled from two sliding elements that are arranged to run parallel to one another on a supporting frame, whereby their longitudinal extension is aligned approximately vertically to the live conductor. Sliding strips, which consist of graphite, are attached to the supporting frame in U-shaped supporting profiles, which are made of aluminum. The supporting frame itself is connected to the vehicle via an arm-shaped seesaw-type mounting support.

The graphite material that is used for the sliding element in accordance with the prior art exhibits high wear. Abrasive wear is caused by frictional contact with the live conductor, whereas oxidative wear arises via the aforementioned formation of sparks during the short-term lifting up of the sliding element from the live conductor during travel. A further problem is the low strength of the graphite material which necessitates a profiled element in order to supportively mount the graphite strips. In this way, the problem is posed to the effect that, on the one hand, the graphite strip has to be sufficiently wide for stability reasons and, on the other hand, an adequate height of the graphite strip has to remain free in order to ensure sufficient contact over the graphite material up to a certain level of abrasion. The losses of graphite material that are due to wear are considerable, especially under extreme conditions such as, for example, in the case of high speeds with a corresponding evolution of heat and also under the influence of extreme coldness, for example, during winter operation, whereby the live conductor confronts the graphite with an extremely uneven surface as a result of ice formation. In addition, the supportive mounting of the graphite strips in a profiled support leads to shapes that are unfavorable in regard to air flow and that, on the one hand, possess a high air resistance and lead to the development of noise during operational conveyance, especially at high speeds of conveyance. Another problem shown by the conventional sliding elements is the different thermal expansion coefficients between the graphite strips and the profiled supports, which are made of aluminum. Time-consuming connection of these different components with corresponding cost consequences arise from this. In order to compensate for the occasional lifting up of the sliding element from the live conductor that leads to interruptions in the current, each brush contact is equipped with two sliding elements that, as already mentioned above, are connected to one another via a see-saw mounting device, so that, as a result, it is the intention to assure, in each case, that at least one sliding element restores contact with the live conductor.

A brush contact for a railroad locomotive is known from U.S. Pat. No. 4,339,021 and includes a sliding element comprising carbon-fiber-reinforced carbon.

In addition, a brush contact material is known from JP-Abstr. 63-140,050 in which 5–15% by weight of copper-treated carbon fibers are added to a mixture comprising metal powder and graphite powder and the resulting mixture is compacted and sintered after mixing these components. The carbon fibers preferably possess a length of 0.2–10 mm and a coating thickness in the range from 1–10 mm.

DE-A1-39 33 039 discloses a process for the production of oxidation-protected CFC composite materials that comprise a carbon matrix and reinforcing fibers comprising carbon. These composite materials are initially carbonized and, after this, metallic silicon is infiltrated in the liquid state and then reacts with the matrix carbon in the pore zones and also with the carbon fibers to give silicon carbide. In this way, one obtains composite materials with improved oxidation protection but reduced quasi-ductility since the fiber reinforcement is attacked extensively.

A comparable process to that disclosed in DE-A1 39 33 039 is known from DE-A1-41 36 880 for the production of an oxidationresistant component, especially for space travel.

An aerodynamically constructed sliding plate for a high speed brush contact is known from DE-B2-8 30 027. The sliding plate consists of Cu-carbon, CuCd or NiAg.

U.S. Pat. No. 4,339,021 discloses a brush contact for a vehicle, in particular for a vehicle that runs on rails and has a propulsion unit that is to be supplied with an electric current, with a sliding element for the transferral of electric current from a current-carrying live conductor into the vehicle. The sliding element has at least one current-transferral region that is turned toward the live conductor and includes a composite material of carbon-fiber-reinforced carbon. The object of the present invention is to further develop a brush contact for a vehicle, in particular for a vehicle that runs on rails, which significantly reduces wear phenomena and exhibits improved brush contact even under extreme operating conditions.

Proceeding from a brush contact as disclosed in U.S. Pat. No. 4,339,021, silicon carbide formed by infiltration of liquid silicon and reaction with carbon, and electrically highly conducting materials in the form of pins, fibers, foils or strips that run in its longitudinal direction in the flow direction of the current are incorporated in the current-transferral region. As a result of the use of a composite material based on carbon-fiber-reinforced carbon, a higher abrasion resistance is achieved in comparison to graphite, especially under extreme conditions for traveling. In contrast to graphite, the weight of the sliding element and thus that of the brush contact is reduced as a result of this material. Because of the significantly lower mass, lower forces for pressing the components together can be applied in order to press the sliding element against the live conductor. Because of the lower dynamic forces, the forces that act on the sliding element as a result of unevenness along the live conductor are also reduced, so that the sliding element remains in uniform contact with the live conductor even at high speeds. In addition, it has been found that such a sliding element possesses high inherent stability so that expensive profiled elements to supportively mount and guide the sliding element are not required. Rather, such a composite material based on carbon-fiber-reinforced carbon can be equipped with attachment devices only on its lower side so that, in addition to a reduction in weight, the further advantage is achieved that the total height of the sliding element is available for brush contact so that a relatively great height is available for abrasion and a long service life results from this.

It has also been found that the very high temperatures that result from the sliding contact between the sliding element and the live conductor at high speeds, as these arise, for example, in the case of high speed trains, likewise have virtually no effect relative to increased abrasion.

Layer structures comprising silicon carbide are preferably incorporated in the carbon-fiber-reinforced carbon matrix that forms the basic structure of the sliding element. Such layer structures of silicon carbide increase the abrasion resistance of the sliding element. Such layer structures are thin and increase the total strength of the composite material as well as its abrasion resistance. Silicon carbide also excels in combination with the carbon-fiber-reinforced carbon matrix by virtue of the feature that it forms silicon carbide with the carbon from the carbon matrix via infiltration of silicon into the carbon matrix, as a result of which a high strength composite is produced. In addition, the oxidation resistance and thus the time of usage of the sliding element is increased by the silicon carbide.

In order to increase the electrical conductivity of the sliding element in a controlled manner while influencing the characteristics of the sliding element with regard to its abrasion resistance and its weight as little as possible, electrically highly conducting materials are incorporated in the carbon-fiber-reinforced Carbon element. These highly conducting materials preferably consist of very small components, preferably in the form of thin wires or fibers or small metal strips such as foils. Graphite components are also suitable, whereby graphite components are to be preferred when the conductivity of the graphite is adequate for the requirements of current conduction, whereas metal components are preferably added when the electrical properties of the sliding element have to be improved still further or when increased wear protection is required.

These components, which increase the electrical conductivity, are preferably oriented in such a way in terms of their largest dimension that they run vertically to the contact surface of the sliding element or, as the case may be, vertically to the surface of the live conductor. A preferred procedure in order to incorporate metal components into the sliding element is one in which drilled holes are provided in the C/C-SiC component, which is produced as indicated above, and run vertically to the later contact surface of the sliding element, whereby the holes are filled up with, for example, liquid copper. In this connection, the C/C-SiC component can be inserted into a mold and, simultaneously within the framework of filling the pores or passageway openings, a contact plate is cast on the brush contact side that lies opposite the contact surface, whereby the contact plate connects the individual holes or, as the case may be, copper (metal) pins to one another. The pores can also be formed by appropriate spacers that are inserted into the CFK green compact and are later removed. The distribution can be adjusted via the infiltration technique that was mentioned above by way of the feature, for example, that the C/C-component is infiltrated with different components from both sides. In addition, it is also possible to fill up the residual pores of the C/C-SiC element with, for example, molten Cu by means of liquid phase infiltration.

In addition to silicon carbide that increases the oxidation resistance, use can also be made of further wear-reducing components in the carbon-fiber-reinforced carbon matrix or, as the case may be, additives, that increase the wear resistance, in order to increase the operating life of such a sliding element. Titanium carbide and/or zirconium carbide are especially suitable for this purpose.

Preferably, a CFK green compact (carbon-fiber-reinforced polymer) is initially prepared in the final geometry of the brush contact. After this, the polymer matrix is transformed into carbon by means of pyrolysis so that a porous C/C (carbon-fiber-reinforced) component is produced. The voids that remain behind in the C/C component after pyrolysis are filled up with liquid metal (liquid phase infiltration). The molten metal, in the form of liquid silicon, reacts with the carbon matrix and also with the carbon fibers to give silicon carbide.

The addition of titanium carbide and/or zirconium carbide already takes place within the framework of the assembly of the CFK green compact, whereby the position of the addition can be varied, as a result of which a C/C-SiC component can be assembled with a gradient-based distribution of the additive substances. This addition can take place in powder form by being scattered, on the one hand, into the carbon-fiber fabric of the CFK green compact or in the form of an addition of the resin (polymer) during the assembly of the CFK green compact by means of a lamination process or an injection process. In each case, the inclusion of these components in the assembly of the CFK green compact is a preferred procedure, since optimum adjustment is possible even in the narrowly delineated zones of the titanium carbide distribution or the zirconium carbide distribution.

In order to achieve an optimum balance between a high electrical conductivity of the sliding element, high strength, good oxidation resistance and low weight, the proportion of silicon carbide and the added wear-reducing components should amount to between 15% and 50% based on the mass of the sliding element. The proportion of free, unbound silicon should amount to between 0% and 10% of the mass of the component; the range between 15% and 50% is applicable when the brush contact contains only silicon carbide in order to increase its abrasion resistance and oxidation resistance.

Components that increase the electrical conductivity can be introduced into the sliding elements in such a way that their proportion by volume in the individual layers varies proceeding from the contact surface to the opposite current-tapping surface, whereby the highest proportion of these components should lie in the region of the surface layer that is turned toward the live conductor. As a result of this, the conduction of current in the region of the surface layer and the oxidation resistance of the surface layer are increased, while the region of the brush contact side that, in the final analysis, is not subject to abrasion, even in the case of a worn-out sliding element, can be optimized in regard to its stability.

The electrically highly conducting materials, that are used in the form of fibers, pins and/or strips, should possess a cross-sectional dimension in the range from 0.1 mm to 0.5 mm (foil) and from 1 mm to 5 mm (strips and pins). Electrically highly conducting materials such as copper are introduced into the sliding elements in a defined manner.

The sliding element can be subdivided into individual zones by the components that increase electrical conductivity, whereby the zones or surfaces of increased conductivity run vertically to the live conductor or, as the case may be, the contact surface, and preferably run vertically to the sliding direction as has already been explained above. The inclusion of such zones of increased electrical conductivity preferably involves inclusion of components with volumes that are large in contrast to the embedded wires, sheets or foils. This has the advantage that the structure can be assembled by means of simple production methods, for example connecting techniques, with only a few individual parts that can be readily handled. In this connection, graphite zones with carbon-fiber-reinforced carbon zones, which have preferably been filled with silicon carbide, can alternate with each other to maintain good current conduction on the one hand and, on the other hand, in order to positively influence the wear characteristics.

The zones of increased electrical conductivity should have a thickness of 1 mm to 5 mm and the average distance from zone to zone should lie in the range from 5 mm to 10 mm, i.e. in the case of a sliding element, which can have a width of approximately 40 mm, two to three such zones of increased electrical conductivity are provided.

Since the brush contacts in accordance with the invention excel by virtue of sliding elements that can be assembled in a self-supporting mode of construction, it is possible to provide these sliding elements with a profile that is favorable in terms of aerodynamics. In conjunction with brush contacts for high speed trains, this ensures the low evolution of noise and, in addition, the turbulence in the area of the sliding element that has a negative effect on implementing uniform contact along the sliding wire is reduced. Irrespective of the supporting profiles that are required in accordance with the prior art, the possibility also exists of providing the sliding elements with a profile such that they experience increased pressing of their contact surface onto the live conductor at increasing speeds. A supporting cross-sectional profile is suitable for this purpose, which, for example, possesses a more marked curvature toward the live conductor, i.e. on the contact surface, than at the opposite current-tapping side, so that a negative pressure is produced at the live conductor. Because of the high material strength, it is also possible to construct the sliding element in the form of a hollow profile and this leads to a further reduction in mass together with the advantages that are associated therewith. A technique in which a carbon-fiber-reinforced carbon composite material is assembled in a green state, is again suitable for the preparation of such a profiled or hollow sliding element, whereby the composite material is then reinforced by infiltration with liquid silicon and a subsequent heat treatment with the formation of layer structures comprising silicon carbide. As a result, a high-strength sliding element is obtained with a final geometry that does not have to be reworked, although it can easily be optimized with respect to the desired geometries in the green state of the element.

Since vehicles, especially high speed trains, are not unambiguously defined in terms of their direction of travel, it is particularly advantageous—especially in combination with profiles of the sliding element that are favorable in terms of aerodynamics—to mount these in a manner that permits rotation about an axis that runs vertically to the contact surface and to the live conductor, in order to rotate this profile of the sliding element in accordance with the direction of travel. This can take place by means of an adjusting drive system, e.g. by means of an electric servomotor.

Because of the advantages in regard to low weight, good contact properties and the resultant smooth-running contact, it is possible to operate with a single sliding element on each brush contacts, in contrast to the prior art that utilizes two such sliding elements.

DETAILED DESCRIPTION OF THE PREFERRED EMBODIMENTS

Figure 1:
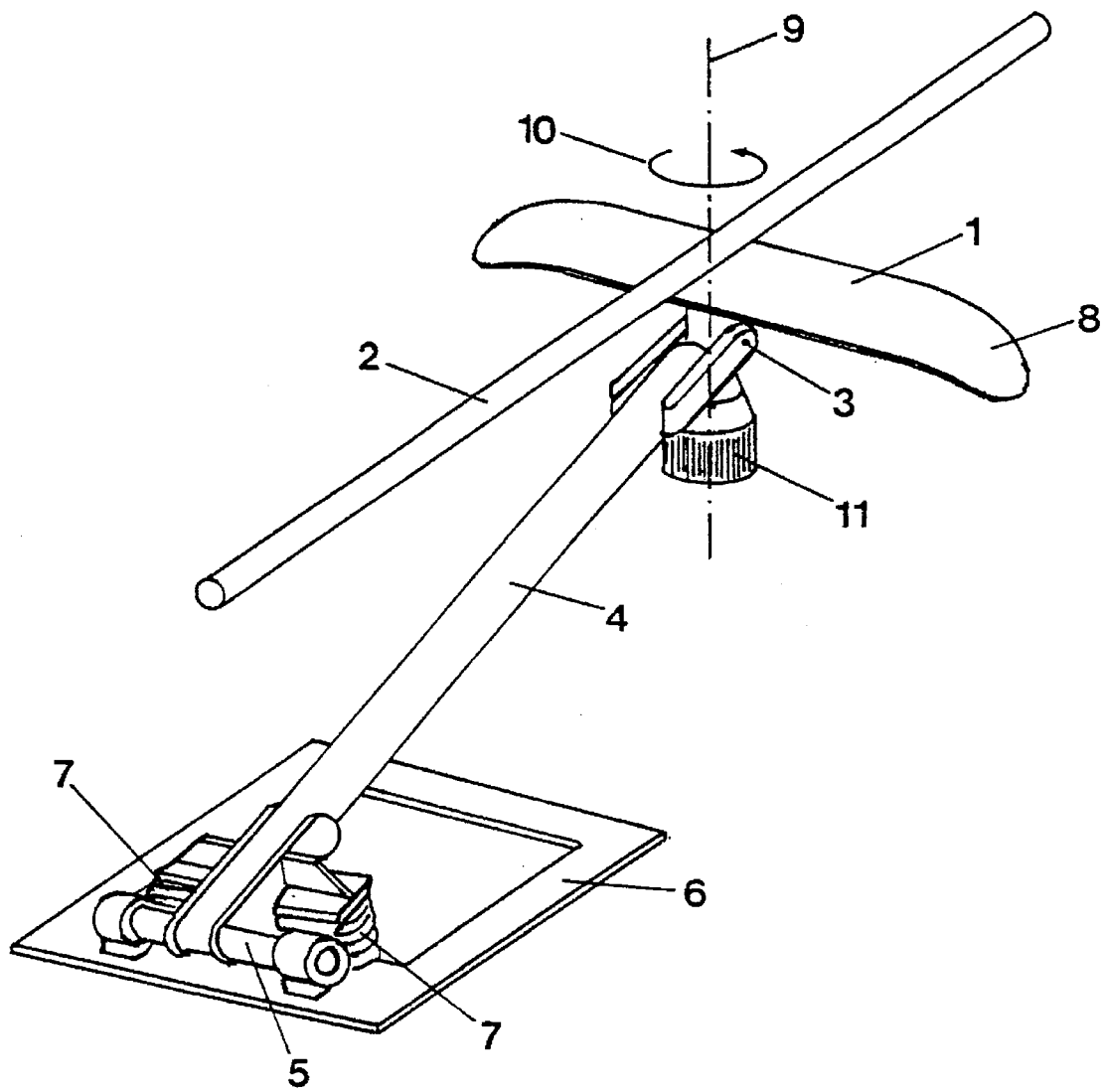
FIG. 1 is a schematic perspective of a brush contact at an overhead live conductor.

The brush contact as it is schematically illustrated in FIG. 1, has a sliding element 1 that is guided along a live conductor 2 in sliding contact therewith. Sliding element 1 is attached to an arm 4 by means of a joint 3, and arm 4 is connected at its other end to a mounting support 5 with a supporting frame 6 on the vehicle side. Sliding element 1 is held in contact against live conductor 2 by means of hydraulic or pneumatic elements 7 that engage between supporting frame 6 and arm 4 and ensure the necessary pressing of sliding element 1 onto live conductor 2.

Under operating conditions, the contact surface 8 of sliding element 1 can be aligned in one plane with respect to the live conductor.

Sliding element 1 is constructed in the shape of a wing which runs transversely to the extension of live conductor 2. The width in the direction of live conductor 2 amounts to approximately 20 to 30 cm, whereas the length of strip-shaped sliding element 1 is selected in such a way that sliding elements 1, which run off-center relative to live conductor 2, also remain in contact with live conductor 2. The live conductor is usually clamped in an oblique and zigzag manner so that it travels back and forth on sliding element 1 during operational travel.

In addition, sliding element 1 is mounted in a manner that permits turning, by means of an electric servomotor 11 and a stopping device, around an axis 9 at arm 4 in the direction of the rotating arrow 10. Depending on the direction of travel of the vehicle along live conductor 2, the sliding element can be rotated by 180° by means of the servomotor 11; this is especially advantageous when the cross-sectional profile of the sliding element 1 is different in the direction of live conductor 2 or, as seen in the direction of travel, so that the cross-sectional profile can be rotated depending on the direction of travel.

Figure 2:
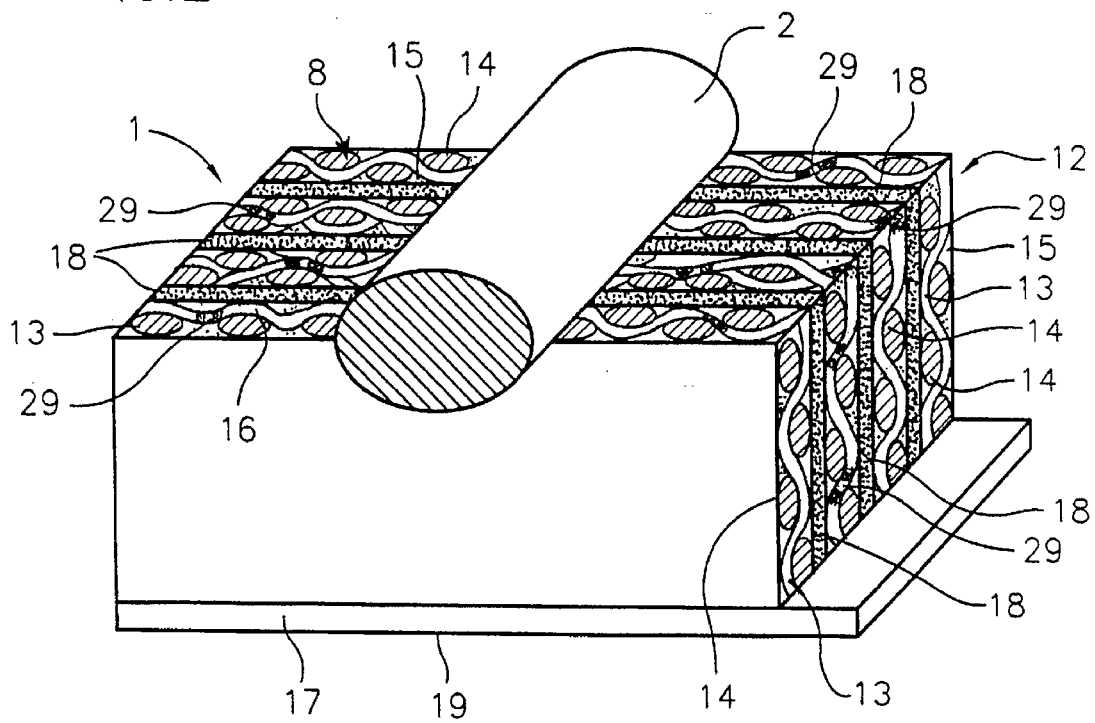
FIG. 2 is a schematic perspective of a partial section of the sliding element that engages with the live conductor.

Sliding element 1 of the brush contact is assembled from a carbon-fiber-reinforced carbon element 12 as illustrated schematically in FIG. 2. Element 12 has a carbon-fiber structure with transverse fibers 13 and longitudinal fibers 14. This fiber element, which is initially manufactured in a shape that corresponds, in essence, to the final geometry of sliding element 1 and is then infiltrated with liquid silicon, is filled with silicon carbide 15 in final state, whereby the silicon carbide is formed via the reaction of the silicon with the carbon in the carbon matrix and leads to a solid composite. In addition, powder-type additives 16 are deposited in layers 15. In addition, element 12 is provided with copper pins 29. This sliding element possesses a very light structure that is stable in regard to shape, wherein the abrasion resistance of the structure is increased by the individual silicon-carbide layer structures. In addition to this, the conductivity is increased by added copper pins 29. A contact plate 17 comprising aluminum, with which the current is tapped off, is provided on the lower side of carbon-fiber-reinforced carbon element 12. In addition, three fabric layers 18 comprising carbon fibers are embedded schematically and by way of example in carbon-fiber-reinforced carbon element 12 and run perpendicularly to contact surface 8 and perpendicularly to the longitudinal extension of live conductor 2. The assembly of the fabric layers is preferably perpendicular to live conductor 2. A good electrical contact of contact surface 8 through carbon-fiber-reinforced carbon element 12 to lower side 19 of the sliding element is achieved by means of the incorporation of metal pins or metal rods 29, which are formed, for example, by filling in holes formed in element 12 with liquid copper. A good current conduction is ensured as a result of this. For this purpose, contact plate 17 can connect the individual metal pins 29 to one another and can, likewise, be manufactured from copper.

A lightweight but high-strength arrangement is achieved using an assembly for the sliding element in the form in which this is illustrated by FIG. 2, and this arrangement leads to low dynamic forces during operational travel so that one can maintain, at a relatively low level, the forces that must be loaded by means of adjusting elements 7 that operate on arm 4.

Figure 3:
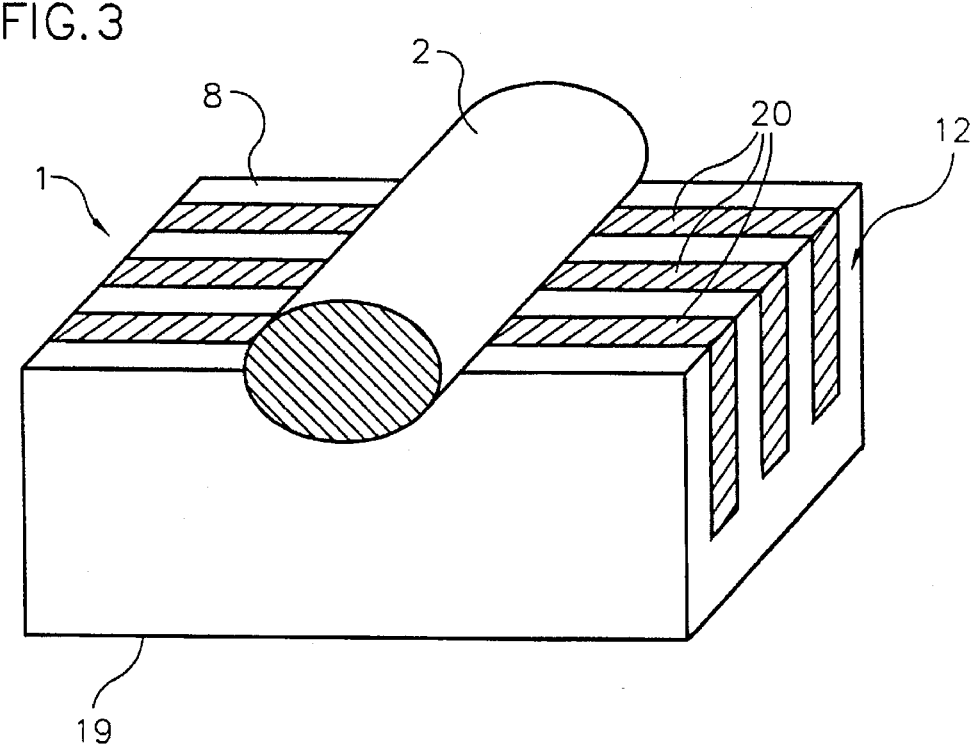
FIG. 3 shows a composite element in which individual graphite layers have been incorporated into the structure of the sliding element.

In the embodiment shown in FIG. 3, a carbon-fiber-reinforced carbon element 12 has been filled with silicon carbide in its voids and, optionally, conducting additives in accordance with the structure of FIG. 2. Three thin graphite lamellae or graphite layers 20 have been incorporated into this carbon-fiber-reinforced carbon element wherein the layers run vertically to contact surface 8 and transversely to the longitudinal extension of live conductor 2. These graphite lamellae serve for the purpose of increasing the conduction of electricity from contact surface 8 to lower side 19 of sliding element 1. Moreover, supporting plate 17 of FIG. 2 is not used in the form of embodiment of FIG. 3, since this supporting function is provided by the lower region of the carbon-fiber-reinforced carbon element 12. Of course, a supporting plate can be provided at lower side 19 in the embodiment of FIG. 3.

Figure 4:
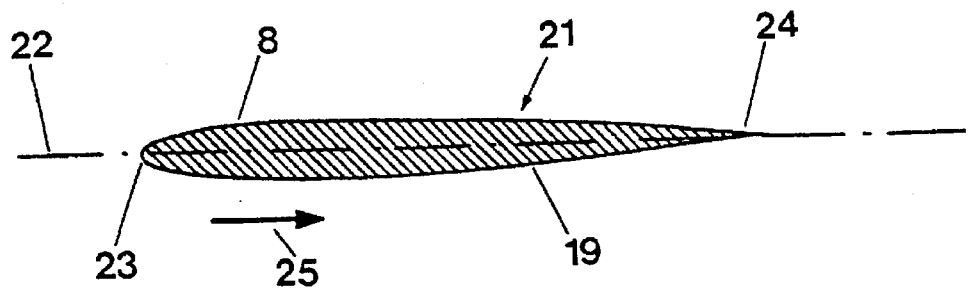
FIG. 4 is a schematic side section of an aerodynamic sliding element.
Figure 5:
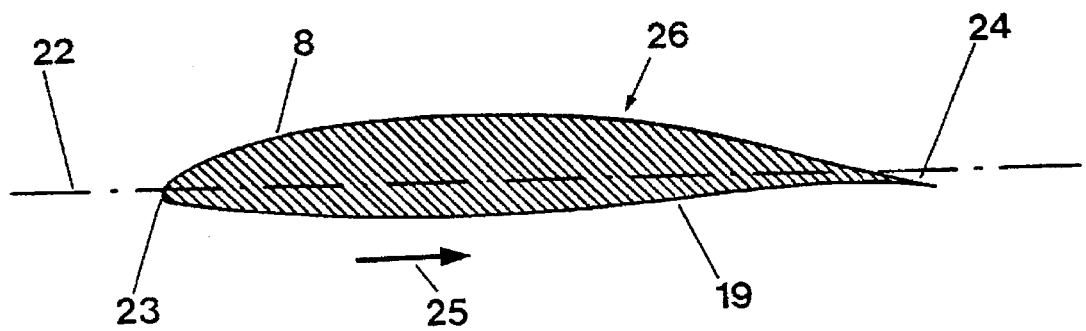
FIG. 5 is a schematic side section of another aerodynamic sliding element.
Figure 6:
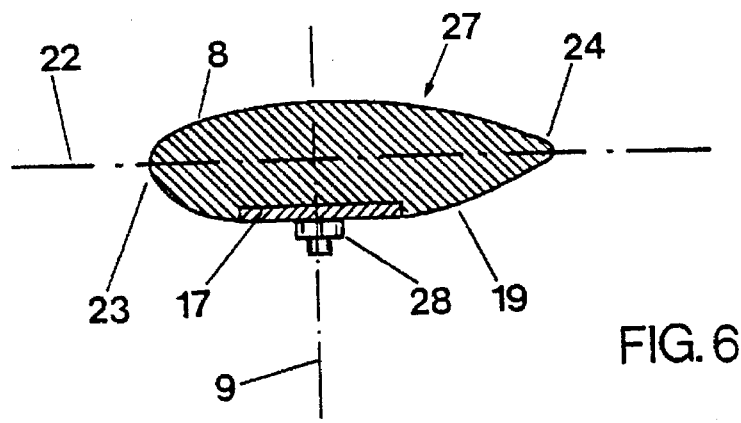
FIG. 6 is a side section of a sliding element with a supporting plate.

Since the brush contact with the sliding element described on the basis of FIGS. 1 through 3 is suitable for high speed applications such as high speed trains, cross-sectional profiles are advantageous as they are illustrated in FIGS. 4 through 6, since these possess favorable aerodynamic properties.

The flow profile 21 shown in FIG. 4 is assembled symmetrically with respect to a central line 22 with a rounded off flow-inducing edge 23 and a sharp flow-terminating edge 24 at the opposite end, whereby the incoming air flow generated by travelling is indicated by arrow 25. Laminar flow is achieved as a result of this profile. In order to modify such a profile to the direction of travel or to the incoming flow direction 25, the profile can be rotated via servomotor 11 of FIG. 1.

FIG. 5 shows a flow profile 26 that has been constructed in such a way in relation to central line 22 that the upper side or contact surface 8 is more intensely curved than lower side 19. Because this is an airfoil, a negative pressure is generated on contact surface 8 due to the air that flows around the profile and the negative pressure presses sliding element 1 onto-live conductor 2. This negative pressure and hence the force that presses the components together are increased with increasing speed of the vehicle.

A cross-sectional profile 27 with a relatively thick cross-section perpendicular to contact surface 8 is illustrated in FIG. 6, wherein supporting plate 17 is arranged so that no turbulence is generated by supporting plate 17. In addition, attachment elements 28 can be seen that project from the lower side of supporting plate 17, wherein the axis of rotation 9 is indicated by the line projecting from these attachment elements 28 and wherein—depending on the direction of travel—the profile can be rotated about this axis by servomotor 11 of FIG. 1.

What is claimed is:

1. Brush contact for a vehicle having a propulsion unit that is supplied with electric current through said brush contact from a current carrying live conductor, said brush contact comprising a sliding element having a current transferring region having a contact surface and a thickness through which current is transferred from said live conductor in a flow direction, said current transferring region comprising a carbon fiber reinforced carbon matrix, a wear reducing component comprising silicon carbide formed by infiltration of liquid silicon and reaction with carbon in said matrix, and electrically conducting materials running in the flow direction in said matrix, said electrically conducting materials being selected from the group consisting of pins, fibers, foils and strips.

2. Brush contact as in claim 1 wherein said wear reducing component is 15% to 50% of the mass of the sliding element.

3. Brush contact as in claim 1 wherein said electrically conductive materials comprise at least one of graphite, copper, and aluminum.

4. Brush contact as in claim 1 wherein said electrically conductive materials comprise foils having a thickness of 0.1 mm to 0.5 mm.

5. Brush contact as in claim 1 wherein said electrically conductive materials comprise pins having a diameter of 1 mm to 5 mm.

6. Brush contact as in claim 1 wherein said sliding element is profiled as an airfoil in order to press said contact surface against said live conductor.

7. Brush contact as in claim 1 wherein said sliding element further comprises a metal support plate opposite from said contact surface.

8. Brush contact as in claim 1 wherein said wear reducing component has a density which is highest at said contact surface.

9. Brush contact as in claim 8 wherein said wear reducing component has a density gradient over the thickness of said current transferring region.

10. Brush contact as in claim 1 further comprising means for rotating said sliding element about an axis which is perpendicular to the contact surface and live conductor.

11. Brush contact as in claim 10 wherein said means for rotating said sliding element comprises a servomotor.

12. Brush contact as in claim 1 further comprising additional wear reducing components comprising at least one of titanium carbide, zirconium carbide, and silicon dioxide.

13. Brush contact as in claim 12 wherein said additional wear reducing components are introduced into said matrix in powder form.

14. Brush contact as in claim 12 wherein said wear reducing component and said additional wear reducing components 15 to 50% of the mass of the sliding element.

15. Brush contact as in claim 1 wherein said electrically conducting materials are concentrated in laminar zones.

16. Brush contact as in claim 15 wherein said laminar zones have a thickness of 1 mm to 5 mm.

17. Brush contact as in claim 15 wherein said laminar zones are spaced apart by 5 mm to 10 mm.

18. Brush contact as in claim 15 wherein said electrically conducting material is graphite.

* * * * *

UNITED STATES PATENT AND TRADEMARK OFFICE
CERTIFICATE OF CORRECTION

PATENT NO. : 5,657,842
DATED : August 19, 1997
INVENTOR(S) : Walter KRENKEL et al.

It is certified that error appears in the above-identified patent and that said Letters Patent is hereby corrected as shown below:

In column 1, line 15, after "buses" delete -- -- --.

In column 2, line 39, after "oxidation" insert -- -- --.

In column 3, line 44, change "Carbon" to -- carbon --.

In column 7, line 6, after "in" insert -- the --.

In Claim 10, column 8, line 67, after "and" insert -- the --.

In Claim 14, column 9, line 11, after "components" insert -- are --.

Signed and Sealed this

Twentieth Day of June, 2000

Attest:

Attesting Officer

Q. TODD DICKINSON

Director of Patents and Trademarks